April 26, 1927.  H. C. MARTIN  1,626,246

ARTICLE OF BONDED GRANULAR MATERIAL AND METHOD OF MAKING THE SAME

Filed Nov. 13, 1924

INVENTOR
Harry C. Martin
By Byrnes, Stebbins & Carmelee
His Attys

Patented Apr. 26, 1927.

1,626,246

UNITED STATES PATENT OFFICE.

HARRY C. MARTIN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ARTICLE OF BONDED GRANULAR MATERIAL AND METHOD OF MAKING THE SAME.

Application filed November 13, 1924. Serial No. 749,773. REISSUED

The present invention relates to articles of bonded granular material and their process of manufacture, this application being a continuation in part of my co-pending application, Serial No. 690,766, filed February 5, 1924.

While this invention is applicable to various articles of bonded granular material, it will first be described with particular reference to its embodiment in abrasive disks of the type used on machines known as disk grinders for the grinding of flat surfaces on metals and other materials. These disks must have a relatively high degree of porosity to prevent glazing and hence the proportion of the binder with respect to that of the abrasive grains is limited and the amount of agglomerating pressure is also limited. It is important, therefore, that the bond between the abrasive grains possess a high degree of mechanical strength. Such disks usually consists of a paper or cloth backing or body coated with a layer of abrasive material bound to the backing by means of glue after the manner of ordinary sand paper and emery cloth. Their use is limited, due to the fact that when using a glue binder, the coating must be relatively thin and the disks do not, therefore, possess very much durability when called upon to do heavy work or remove large quantities of metal.

I have discovered that a very efficient disk of superior quality can be made by the use of a mixture of abrasive grains and a synthetic resin such as a phenol resin. The phenol resin which I prefer to employ is known under the trade name of redmanol. Redmanol is a synthetic resin which consists of a phenolic body mixed with a hardener. This hardener is a formaldehyde compound such as hexamethylenetetramine. I prefer to use the redmanol in a powdered form.

In the accompanying drawings, forming part of this specification,

In the manufacture of disks in accordance with my invention, I prefer to proceed as follows: I first take graded abrasive grains of the proper size or grit for the work to be ground, and add a sufficient quantity of a resin solvent to coat the surface of the grains. I prefer to employ furfural as the coating solvent, using this substance in the proportion of approximately 30 cubic centimeters thereof to 1000 grams of grains if the latter are of medium size or grit. For abrasive grains of the finer grade, however, the amount of the solvent employed may be as low as 25 cubic centimeters per 1000 grams of grains, while it may run as high as 40 cubic centimeters per 1000 grams of grains of the coarser grade. Furfural is an aldehyde which has the property of acting with the hexamethylenetetramine constituent of the redmanol to form also a resin of a character similar to redmanol resin. Having moistened the abrasive grains with a sufficient quantity of the solvent to coat all of their surfaces, I then mix redmanol in powdered form therewith. If the abrasive grains are of medium size or grit, a sufficient quantity of redmanol will be added to constitute approximately 10 per cent by weight of the mixture. The redmanol may, however, constitute from 7 to 15 per cent of the mixture, depending upon the grade of the abrasive grains, the finer grits requiring more of the resin than the coarser grits. When the resin is thus added to the moistened grains, the furfural dissolves enough resin to coat the grains uniformly over their surfaces with the solution of furfural and resin. The furfural also tends to carry the dissolved binder into the pores of the grains. In this way a good bond is obtained between the grains and binder, even with a comparatively dry mixture. The ingredients are mixed quickly to keep the mass from balling up, and they form a mass of quite dry consistency which can be readily spread in thin layers of great uniformity. This is not possible with wet mixtures.

Figure 1:
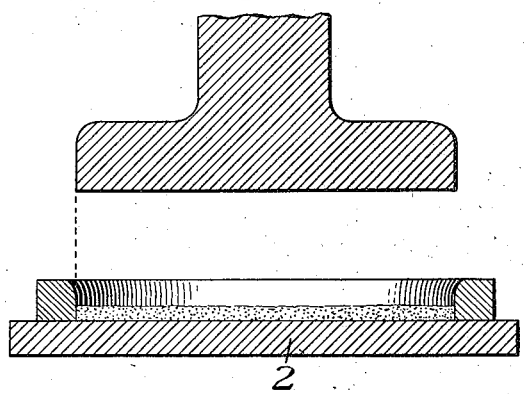
Figure 1 is a sectional view of a suitable mold which may be employed in the manufacture of the disks.
Figure 2:
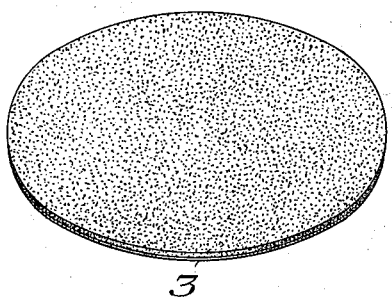
Figure 2 is a perspective view of a finished disk.
Figure 3:
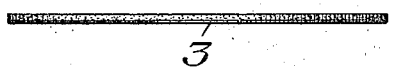
Figure 3 is an edge view of the disk shown in Figure 2.

After this mixture is thoroughly incorporated, it is placed in an iron mold of the shape required for the disk, such as is shown in Figure 1, evenly spread over the bottom plate 2 of the mold, and molded under a pressure of approximately 900 pounds to the square inch. The material is then removed from the mold and baked in an oven for 15 hours at a temperature of about 350 degrees F. The next step is to mount the disk on a cloth backing 3 of the same size as the disk, so that the disk can be supplied to the user in a form that can be fastened readily to the base plate of the disk grinding machine. These machines are operated at very high working speeds, and the cloth backing supplies additional strength to the thin abrasive material, and forms an elastic cushion between the abrasive material and the face plate. The cloth also serves to give a surface to which glue can be easily and firmly applied for fastening the disk to the face plate. I preferably use for mounting the disk on a cloth backing a magnesia oxychloride cement. I have found that this cement shows great adhesion between the redmanol body and the fabric, and is also unaffected by the binders which are commonly employed for cementing the disks to the iron face plate, and which may be glue or silicate of soda.

An important advantage of my invention lies in the fact that I am enabled to mold abrasive disks and abrasive wheels of exceedingly small thickness, there being no difficulty in making disks of large diameter as thin as 3/64 inches.

Another advantage of my invention is that the substance furfural, which is preferably used for moistening the grains, thoroughly wets all of the surfaces of the grains, so that when the powdered redmanol is added to the mixture, this film of furfural on the grains dissolves a certain amount of the redmanol and tends to carry it into the pores of the grains, thus coating all of the surfaces of the grains with a solution of furfural and redmanol. This coating, after baking, forms a resin of substantially the same composition as the principal binder. This adds greatly to the perfection of the bonding of the grains.

There are many other advantages arising from this method of making abrasive disks. The disks are cheap to produce, because although made from a resin, the mixture is molded cold and does not have to be previously melted, such as is the case with mixtures of shellac, certain other phenol resins and other elastic binders. Only one baking or heating of the disks in the oven is required, and the disks do not have to be applied to their backings before being subjected to the baking, so that destruction of the backings, due to the baking temperature, is avoided. Moreover, a very open free-cutting abrading material is produced, this material possessing great strength and durability, such as is required for very difficult grinding operations. The material produced is waterproof and can be used on any operations where water is required to obtain a cool cutting material and avoid drawing the temper of steel or otherwise affecting the material being ground.

While I have described my invention with particular reference to the manufacture of abrasive disks, the invention is not limited to this particular use but may be employed with advantage for the making of other articles of bonded granular material, whether of an abrasive nature or not. For example, the invention is also particularly applicable to the manufacture of a filtering medium, because by reason of the superior quality of the bond it is possible to reduce the amount of the binder to such an extent as to secure the desired high degree of porosity in the article without rendering the article mechanically weak.

I claim:

1. An article of bonded granular material, formed from a mixture comprising a synthetic resin and grains having their surfaces moistened with a resin solvent, substantially as described.

2. An article of bonded granular material, formed from a mixture comprising a phenol resin and grains having their surfaces moistened with furfural, substantially as described.

3. An article of bonded granular material, formed from a mixture comprising a synthetic resin and grains having their surfaces moistened with a resin solvent, said article having its bond hardened by heat treatment, substantially as described.

4. The method of making an article of bonded granular material, comprising moistening the surfaces of the grains with a resin solvent and then mixing the moistened grains with a synthetic resin, substantially as described.

5. The method of making an article of bonded granular material, comprising moistening the surfaces of the grains with furfural and then mixing the moistened grains with a phenol resin, substantially as described.

6. The method of making an article of bonded granular material, comprising moistening the surfaces of the grains with a resin solvent, mixing the moistened grains with a synthetic resin, forming the article from said mixture, and heat treating it to harden the binder, substantially as described.

7. An abrasive article, formed from a compacted and baked mixture comprising a synthetic resin and abrasive grains whose surfaces have first been moistened with a resin solvent, substantially as described.

8. An abrasive disk consisting of a backing and an abrading portion, said abrading portion being formed from a substantially dry, compressed and baked mixture comprising abrasive grains moistened with a resin solvent, and a phenol resin, substantially as described.

9. An abrasive disk consisting of a backing and an abrading portion, said abrading portion being formed from a substantially dry, compressed and baked mixture comprising abrasive grains moistened with furfural, and a phenol resin, substantially as described.

10. An abrasive article comprising a molded and baked mixture of abrasive grains moistened with furfural, and a phenol resin, the phenol resin constituting between 7 and 15 per cent by weight of the mixture, substantially as described.

11. The method of making abrasive articles which comprises moistening the surfaces of the grains with furfural, mixing the moistened grains with a phenol resin binder, molding the mixture under pressure, and then heating it sufficiently to harden the binder, substantially as described.

12. The method of making abrasive articles which comprises moistening the surfaces of the grains with furfural, mixing the moisened grains with a phenol resin binder in the proportion of about 10 parts by weight of the binder to 90 parts by weight of the moistened grains, molding the mixture under pressure, and then heating it sufficiently to harden the binder, substantially as described.

13. The method of making abrasive articles which comprises moistening the surfaces of the grains with furfural, mixing the moistened grains with between 7 and 15 per cent by weight of a phenol resin binder, molding the mixture under pressure, and then heating it sufficiently to harden the binder, substantially as described.

14. The method of making abrasive articles which comprises adding to abrasive grains furfural in the proportion of from 25 to 40 cubic centimeters of furfural to 1000 grams of the grains, mixing the moistened grains with a phenol resin binder, molding the mixture under pressure, and then heating it sufficiently to harden the binder, substantially as described.

15. The method of making abrasive disks which comprises moistening the surfaces of the grains with a resin solvent, mixing the moistened grains with a phenol resin binder, molding the mixture under pressure into disk form, heating the disk sufficiently to harden the binder, and then cementing it to a backing, substantially as described.

16. The method of making abrasive disks which comprises moistening the surfaces of the grains with furfural, mixing the moistened grains with a phenol resin binder, molding the mixture under pressure into disk form, heating the disk sufficiently to harden the binder, and then cementing it to a backing, substantially as described.

17. The method of making a bonded granular article which consists in moistening the granular material with a resin solvent, mixing a dry comminuted resin therewith, and forming a relatively dry mixture capable of being spread in thin layers with uniformity, then shaping the mixture and baking the same.

18. An article composed of granular material and a resin binder characterized by the fact that the resin immediately adjacent the surfaces of the grains has been spread over the surfaces of the grains in solution so that it is in intimate contact with the grain surfaces while the mass of the resin binder has been maintained in a substantially dry state so that the binder and the particles are evenly and uniformly distributed in the article.

19. The method of making a bonded granular article, containing granular material and a resin binder which consists in intimately distributing the binder over the surfaces of the grains by means of a resin solvent applied to the surface of the grains only, and while maintaining the mass of the resin binder in a substantially dry state so that the binder and particles are capable of being evenly and uniformly distributed, molding the composition in a relatively dry state, and baking the same.

In testimony whereof I have hereunto set my hand.

HARRY C. MARTIN.